United States Patent
Magni et al.

(10) Patent No.: US 10,260,579 B2
(45) Date of Patent: Apr. 16, 2019

(54) DISC BRAKE CALIPER BODY

(71) Applicant: FRENI BREMBO S.p.A., Curno (IT)

(72) Inventors: Fabio Magni, Curno (IT); Marco Ratti, Curno (IT)

(73) Assignee: Freni Brembo S.P.A. (IT)

( * ) Notice: Subject to any disclaimer, the term of this patent is extended or adjusted under 35 U.S.C. 154(b) by 0 days.

(21) Appl. No.: 15/109,389

(22) PCT Filed: Dec. 16, 2014

(86) PCT No.: PCT/IB2014/066954
§ 371 (c)(1),
(2) Date: Jun. 30, 2016

(87) PCT Pub. No.: WO2015/101866
PCT Pub. Date: Jul. 9, 2015

(65) Prior Publication Data
US 2016/0327107 A1 Nov. 10, 2016

(30) Foreign Application Priority Data
Dec. 30, 2013 (IT) .............................. MI2013A2215

(51) Int. Cl.
*F16D 55/228* (2006.01)
*F16D 65/00* (2006.01)
(Continued)

(52) U.S. Cl.
CPC ......... *F16D 65/0068* (2013.01); *F16D 55/22* (2013.01); *F16D 55/226* (2013.01);
(Continued)

(58) Field of Classification Search
CPC ......... F16D 2055/0016; F16D 65/0068; F16D 65/78; F16D 2065/788
See application file for complete search history.

(56) References Cited

U.S. PATENT DOCUMENTS 3,626,580 A * 12/1971 Shakespear ......... F16D 55/2262
29/412
4,440,270 A * 4/1984 Ross ..................... F16D 55/228
188/264 AA
(Continued)

FOREIGN PATENT DOCUMENTS

EP 1462671 A1 9/2004

OTHER PUBLICATIONS

Italian International Search Report dated Mar. 24, 2015 in corresponding PCT Patent Application No. PCT/IB2014/066954.
(Continued)

*Primary Examiner* — Bradley T King
(74) *Attorney, Agent, or Firm* — Waller Lansden Dortch & Davis LLP; Matthew C. Cox

(57) ABSTRACT

Caliper bodies are provided which comprise two transversally spaced apart side formations and one or more transversally extending bridge portions, which connect the first and second side formations. Each bridge portion has a closed loop structure with an extrados, an intrados, two connecting portions transversally spaced apart connecting the extrados to the intrados and a through cavity, which extends in a tangential direction between the extrados and the intrados.

11 Claims, 4 Drawing Sheets

(51) Int. Cl.
    *F16D 55/22*    (2006.01)
    *F16D 55/226*   (2006.01)
    *F16D 55/2265*  (2006.01)
    *F16D 55/00*    (2006.01)

(52) U.S. Cl.
    CPC ....... *F16D 55/228* (2013.01); *F16D 55/2265* (2013.01); *F16D 2055/0016* (2013.01)

(56) References Cited

U.S. PATENT DOCUMENTS

| | | |
|---|---|---|
| 5,394,963 A | 3/1995 | Deane et al. |
| 6,298,954 B1 | 10/2001 | Weiler et al. |
| 8,151,951 B2* | 4/2012 | Cornolti ................ F16D 55/228 188/250 B |
| 2009/0071767 A1* | 3/2009 | Bass .................... F16D 55/228 188/72.5 |
| 2013/0092481 A1 | 4/2013 | Crippa et al. |
| 2015/0122596 A1* | 5/2015 | Ruopp .................. F16D 65/097 188/71.8 |

OTHER PUBLICATIONS

Italian Written Opinion dated Mar. 24, 2015 in corresponding PCT Patent Application No. PCT/IB2014/066954.

* cited by examiner

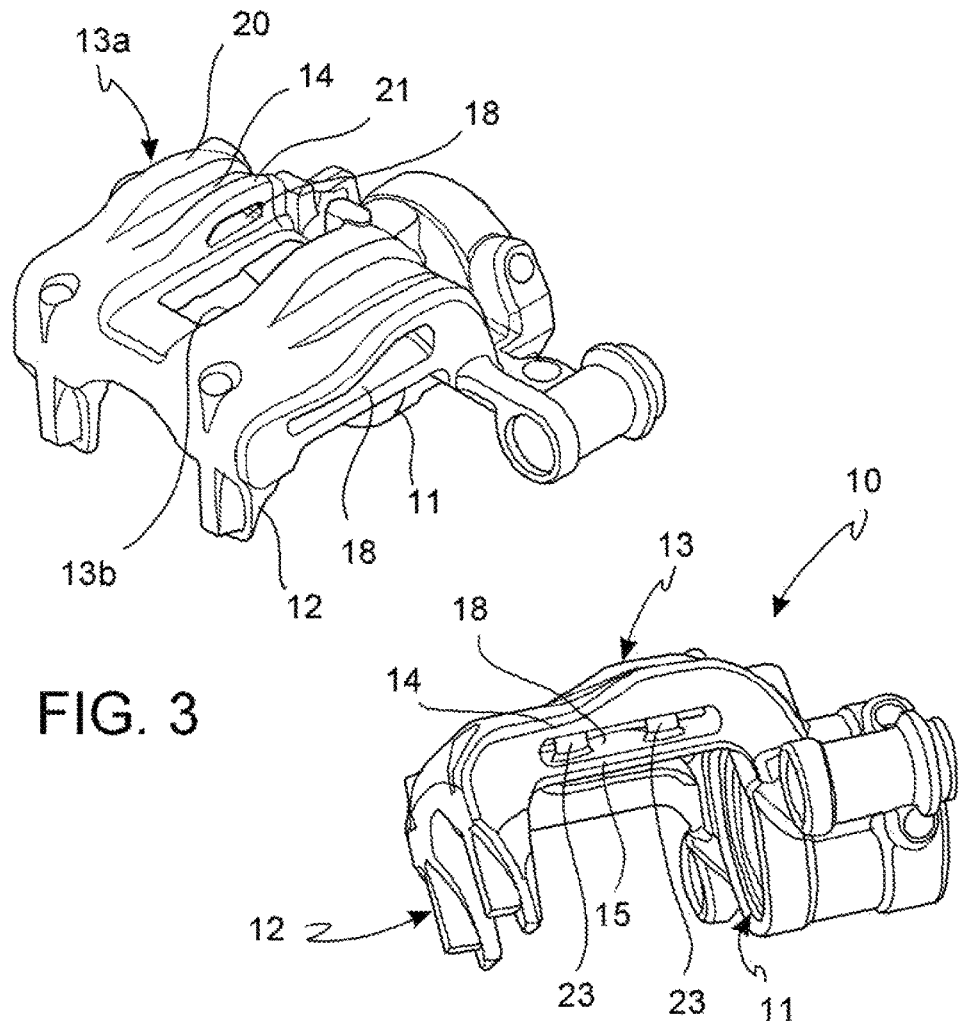
FIG. 3
FIG. 4
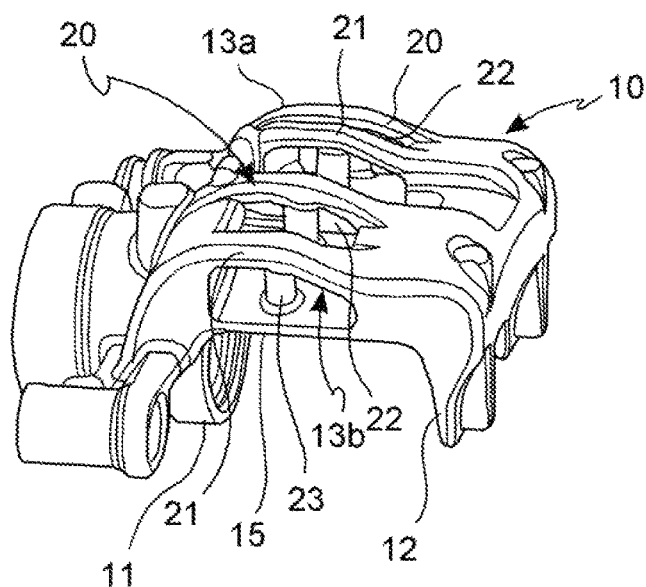
FIG. 5

DISC BRAKE CALIPER BODY

CROSS-REFERENCE TO RELATED APPLICATIONS

This application is a National Phase Application of PCT International Application No. PCT/IB2014/066954, International Filing Date, Dec. 16, 2014, claiming priority to Italian Patent Application No. MI2013A002215 (102013902220959) filed Dec. 30, 2013, each of which is hereby incorporated by reference in its entirety.

FIELD OF THE INVENTION

The present invention relates to a disc brake caliper body, for example for a motor vehicle.

BACKGROUND OF THE INVENTION

It is known that, in a disc brake, the brake caliper is arranged astride the outer peripheral edge of a brake disc. In a floating caliper, the brake caliper comprises a floating body moving between the disc along an axis parallel to the axis of rotation of the disc. The floating body has two elongated side formations which are arranged such as to face two respective opposite braking surfaces of a disc. Friction pads are provided, which are arranged between each elongated formation of the caliper and one of the two braking surfaces of the brake disc. The side formations of the caliper body have cylinders suitable to accommodate hydraulic pistons capable of exerting a thrust action on the pads by causing them to abut against the braking surfaces of the disc to exert a braking action on the vehicle. The side formations are connected to each other by one or more bridge portions, which are placed astride the disc. In a fixed brake caliper, the caliper comprises a fixed body having a pair of elongated side portions facing, while in use, two opposite braking surfaces of the brake disc and a pair of bridge portions connecting the ends of the side portions.

In the car industry, there is an increasing demand for a decrease in the weight of the motor vehicle components in order to reduce the fuel consumption and exhaust emissions. The caliper body is, by being fastened to the vehicle suspension and placed astride the disc, one of the non-suspended masses that are desired to be reduced as much as possible. A need is also felt to improve the structural mechanical characteristics of a disc brake caliper, without increasing the caliper body weight.

Floating caliper bodies are known, which are conceived to increase the characteristics of structural rigidity and/or decrease the weight. For example, U.S. Pat. No. 5,394,963 proposes a composite caliper body in which an inner reinforcement component is sunk. U.S. Pat. No. 6,298,954 discloses a brake caliper body with a bridge formation and two side formations, which are arranged at a right angle to the bridge. The bridge has at least one hollow chamber therein, which is defined by support walls on all sides thereof

SUMMARY OF THE INVENTION

An object of the present invention is thus to provide a solution capable of meeting the need of achieving an excellent result in terms of lightness with the possibility of optimizing the material used to increase the rigidity of the caliper body. Another object of the invention is improving the efficacy of the caliper body in terms of cooling, and particularly improving the ventilation thereof under operating conditions.

These and other objects and advantages are obtained by means of a caliper body having the characteristics set forth in the annexed claims. In summary, a caliper body comprises first and second side formations, which are transversally spaced from each other, and one or more bridge portions extending transversally such as to connect the first and second side formations. The or each bridge portion has a closed-loop structure with an extrados, an intrados, two connecting portions transversally spaced apart connecting the extrados to the intrados, and a through cavity, which extends in a tangential direction between the extrados and intrados.

Due to the hollow or closed-loop or tubular structure of the bridge portion, the caliper body can be considerably lighter and more mechanically resistant than the traditional floating caliper bodies.

If the caliper body is manufactured by fusion, the through cavity can further simplify and speed up the core removal, thereby facilitating the evacuation of the sand cores contained in the jets.

Furthermore, the through cavity allows the passage of an airflow through the caliper body, thereby facilitating quick dissipation of the heat accumulated by the brake caliper.

A further optimization of the resistance/weight ratio and of the use of the material forming the caliper body can be achieved if each extrados has two or more parallel ribs tangentially spaced from each other. The caliper body can be made even lighter if between two ribs of a same extrados an opening elongated in a transversal direction is formed.

The highest mechanical stress within the caliper body can be decreased even more if the bridge portion comprises at least one radially extended pillar element which rigidly connects the extrados to the intrados. A further reduction in the mechanical stress is obtained by arranging the pillar element substantially equally spaced, in a transversal direction, between the two connecting portions connecting the extrados to the intrados of a same bridge portion.

The above-mentioned advantages can be both applied to floating caliper bodies and fixed caliper bodies.

BRIEF DESCRIPTION OF THE DRAWING

Several embodiments of a floating caliper body according to the invention will be now described below by means of exemplary embodiments set forth by way of non-limiting examples only. Reference is particularly made to the attached drawings, in which:

FIG. 3 is a perspective view of a floating caliper body in accordance with a second embodiment of the invention;

FIG. 4 is a perspective view of a floating caliper body according to a third embodiment of the invention;

FIG. 5 is a perspective view of a floating caliper body according to a fourth embodiment of the invention.

DETAILED DESCRIPTION

Figure 1:
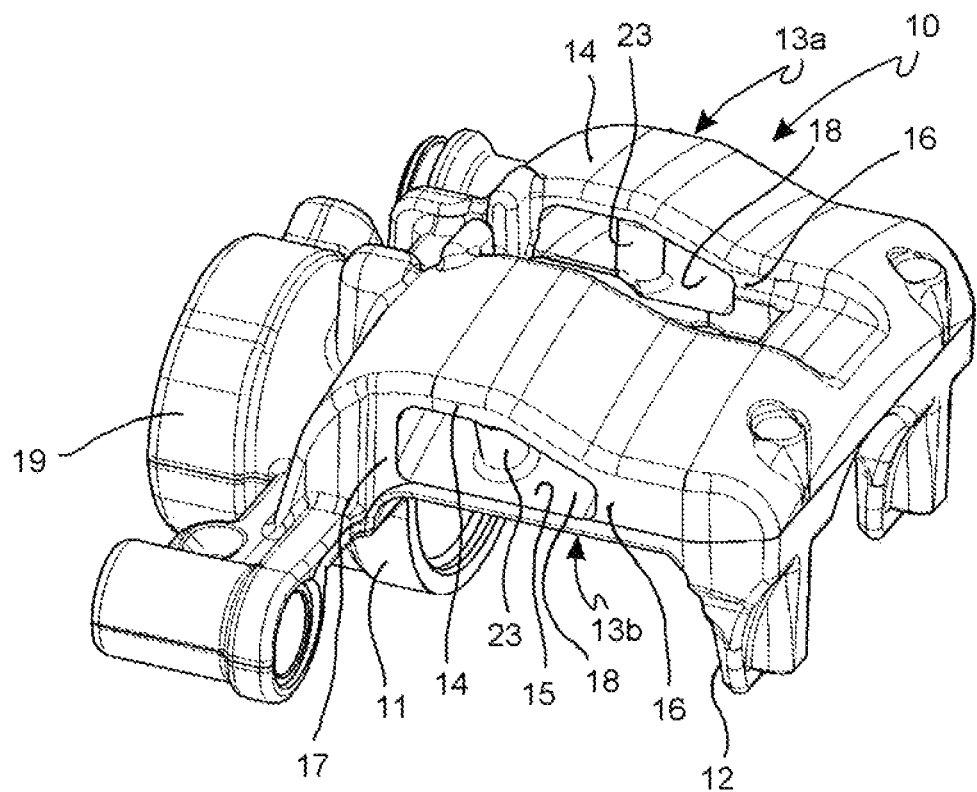
FIG. 1 is a perspective view of a floating caliper body for a disc brake according to a first embodiment of the invention.

In accordance with a general embodiment, several examples of which being illustrated in FIGS. 1 to 5, a floating caliper body of a disc brake generally designated with 10, has a substantially overall U-shape. In a manner conventional per se, the caliper body 10 is suitable to be arranged astride the peripheral edge of a brake disc (not illustrated) such as to be movable relative to the disc in a direction called "transversal" which is herein parallel to the axis of rotation of the disc. Throughout the present description and in the claims, words and expressions designating positions and directions, such as for example "radial", "axial", "transversal", "tangential", etc., are to be construed as referred to the axis of rotation of the disc.

The floating caliper body comprises two side formations or flanges 11, 12 and one or more transversally extending bridge portions 13 which connect the two side formations. The two side formations are transversally spaced from each other such as to face two opposite braking surfaces (not illustrated) of a brake disc.

The flange 11 can form a cylinder 19 suitable to receive a piston (not illustrated) carrying a friction pad (not illustrated). The operation of the floating caliper body depicted in the figures is to be considered as completely known. Consequently, in the following of the present disclosure, only those elements specifically referring to the actuation of the floating caliper body according to the invention will be described. For the manufacture of those parts and elements not illustrated in detail, reference can be thus made to any known solution of floating caliper body, for example in what relates to the mechanical and hydraulic connections for the caliper operation.

Figure 2:
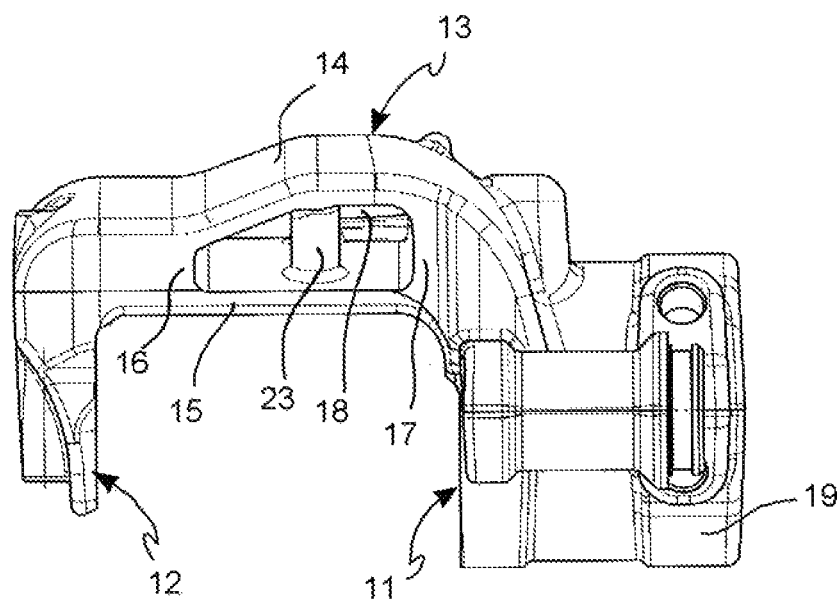
FIG. 2 is a perspective view, from a different point of view, of the floating caliper body of FIG. 1.
Figure 6:
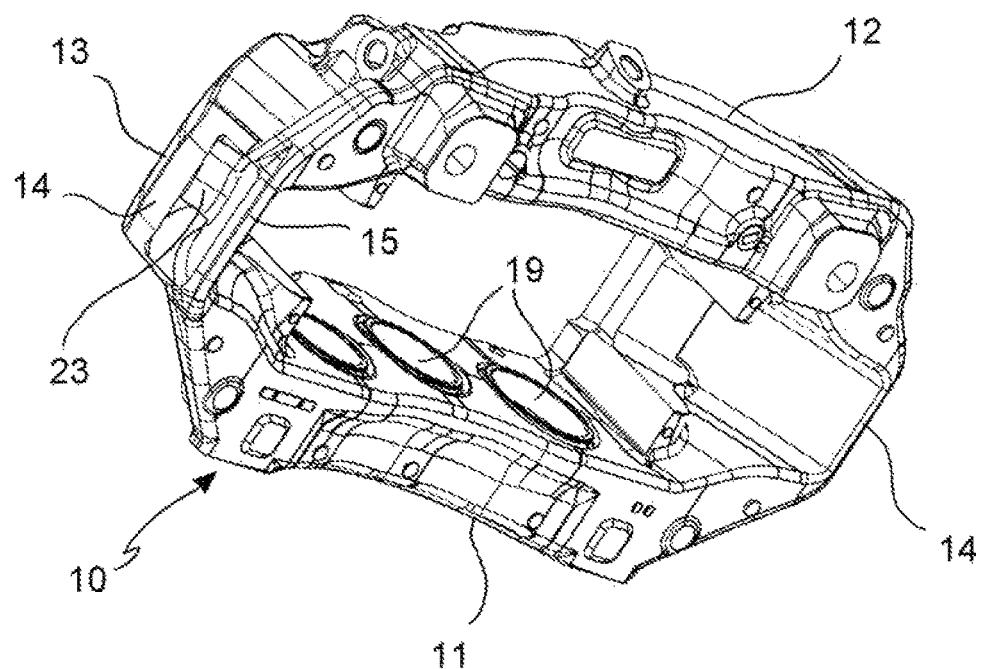
FIGS. 6, 7, 8 and 9 are perspective views, from different points of view, of a fixed caliper body according to a fifth embodiment of the invention.
Figure 7:
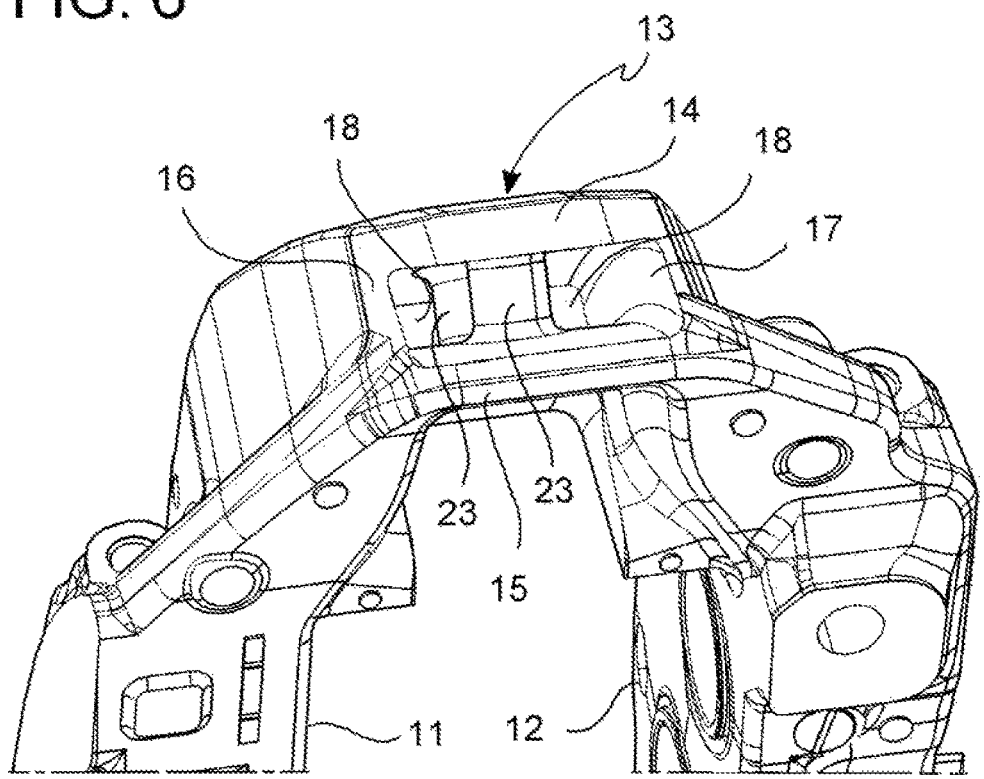
Figure 8:
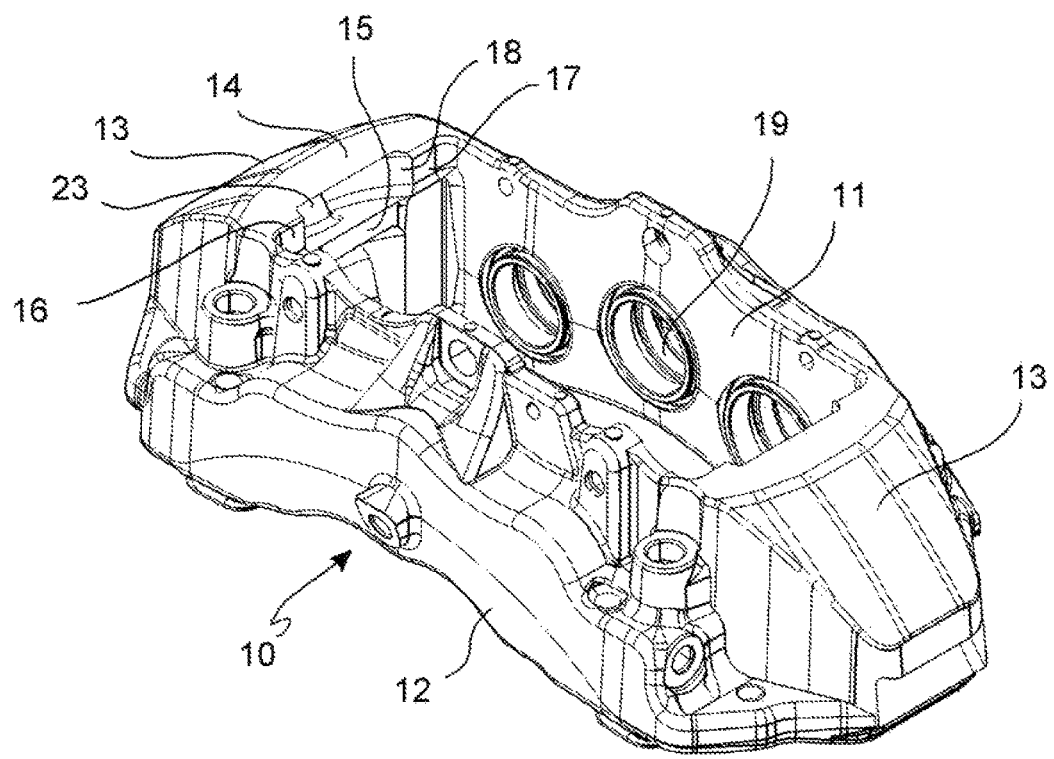
Figure 9:
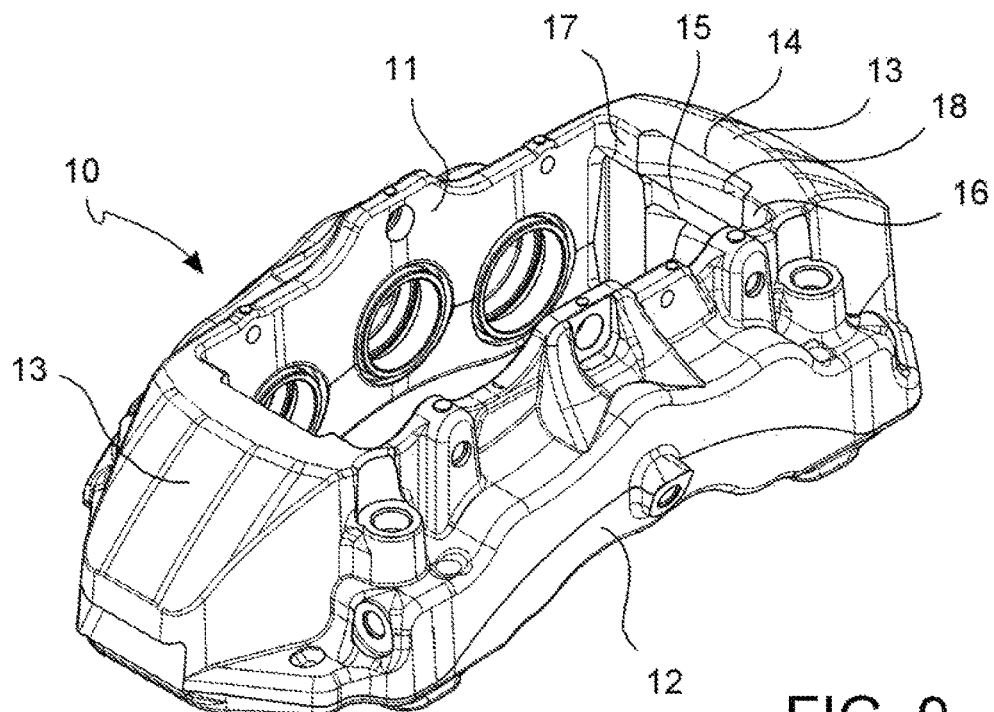

In the particular embodiment illustrated in FIGS. 1 and 2, the floating caliper body has two bridge portions 13*a*, 13*b* substantially parallel and spaced apart from each other in a tangential direction.

According to an embodiment, at least one of the bridge portions 13*a*, 13*b* has a closed loop structure with an extrados 14, an intrados 15, two transversally spaced apart connecting portions 16, 17 connecting the extrados 14 to the intrados 15, and a through cavity 18, extending in a tangential direction between the extrados and the intrados. In the particular floating caliper body illustrated in FIGS. 1 and 2, both bridge portions have the above-mentioned closed loop structure.

In the examples of FIGS. 1, 2 and 3, each of the bridge portions 13*a*, 13*b* has an essentially tubular structure that is passed through the through cavity 18.

While not desiring to be bounded to any specific theory, the tests carried out by the Applicant demonstrate that, due to the hollow or closed-loop or tubular structure of the bridge portion(s) 13, the floating caliper body has, compared to a solid structure having the same mass, a better resistance to loads, particularly torsional and flexural stresses.

In the embodiments illustrated in FIGS. 3, 4 and 5, each extrados 14 of the bridge portions has at least two parallel stiffening ribs 20, 21, tangentially spaced apart from each other. According to the embodiment illustrated in FIG. 5, between the ribs of a same extrados an elongated opening 22 can be formed in a transversal direction.

Each bridge portion can comprise a radially extended pillar element 23 which rigidly connects the extrados to the intrados. In the particular embodiments of FIGS. 1, 2 and 5, the pillar element 23 is substantially equally spaced, in a transversal direction, between the two connecting portions 16, 17 that connect the extrados to the intrados. In the exemplary embodiment of FIG. 4 each bridge formation provides two pillar elements 23, aligned in a transversal plane.

The floating caliper body 10 can be made of metal, such as aluminum, or aluminum alloy, for example aluminum and lithium or steel. The present invention is particularly advantageous when the body 10 is obtained by means of fusion, because the through cavities 18 facilitate the disposal of the sand cores during the sand core removal step, once the jet has been completed. Alternatively, the floating caliper body can be manufactured by means of a mechanical processing with stock removal, or forging.

According to an embodiment illustrated in FIGS. 6 to 9, a fixed brake caliper body 10 comprises a pair of elongated side formations 11, 12, which in use face two braking opposite surfaces of the brake disc and at least one pair of transversally extending bridge portions 13*a*, 13*b* which connect the ends of the two side formations 11, 12. Each bridge portion 13*a*, 13*b* has a closed loop structure with an extrados 14, an intrados 15, two connecting portions 16, 17 transversally spaced apart connecting the extrados to the intrados, and a through cavity 18 extending in the tangential direction between the extrados 14 and the intrados 15.

In the particular embodiment illustrated in FIGS. 6 to 9, each bridge portion 13*a*, 13*b* can comprise one or more radially extended pillar elements 23 which rigidly connect the extrados 14 to the intrados 15. Advantageously, the pillar elements 23 are substantially equally spaced between the two connecting portions 16 and 17, which connect the extrados to the intrados.

The constructional details that can be inferred from the annexed figures should not be considered as limiting. Particularly, the number of cylinders 19 suitable to receive corresponding pistons may be changed, for example 1 to 3. Similarly, the caliper body 10 can be manufactured by fusion as a single block, or from two caliper halves connected by screws, according to modes that are known per se in the art.

Various aspects and embodiments of a floating caliper body according to the invention have been described. It should be understood that each embodiment can be combined with any other embodiment or made independently therefrom. Furthermore, the invention is not limited to the embodiments described herein, but may be varied within the scope of the appended claims.

The invention claimed is:

1. A disc brake caliper body having a U-shape, adapted to be arranged astride an outer peripheral edge of a brake disc, the caliper body comprising:
   a first and a second side formation, transversely spaced from one another so as to face opposite braking surfaces of a brake disc;
   two substantially parallel bridge portions extending transversely and connecting the first and the second side formations;
   wherein at least one bridge portion of the two substantially parallel bridge portions has a closed loop structure with an extrados, an intrados, two connecting portions transversely spaced apart and connecting the extrados and the intrados, and a through cavity which extends in a tangential direction relative to an axis of rotation of the brake disc between the extrados and the intrados;
   wherein the two substantially parallel bridge portions are spaced apart from one another in a tangential direction relative to an axis of rotation of the brake disc.

2. The caliper body of claim 1, wherein each of the two substantially parallel bridge portions further comprises at least one radially extending pillar element which rigidly connects the extrados to the intrados.

3. The caliper body of claim 1, wherein the extrados of the at least one bridge portion of the two substantially parallel bridge portions provides at least two parallel ribs tangentially spaced from one another relative to the axis of rotation of the brake disc.

4. The caliper body of claim 3, wherein said pillar element is substantially equally spaced between the two connecting portions which connect the extrados to the intrados.

5. The caliper body of claim 1, wherein the caliper body is a floating caliper body.

6. The caliper body of claim 5, further comprising:
   at least two parallel ribs tangentially relative to the axis of rotation of the brake disc spaced from one another on the extrados of the at least one bridge portion of the two substantially parallel bridge portions, and
   wherein an opening elongated in a transversal direction is provided between the two parallel ribs.

7. The caliper of claim 1, wherein the caliper body is a fixed caliper body.

8. The caliper of claim 1, wherein the body is obtained by casting.

9. A brake caliper comprising the caliper body of claim 1.

10. The caliper of claim 1, wherein the caliper body is made in a single piece.

11. The caliper of claim 7, wherein the fixed caliper body comprises two mutually facing and releasably connected caliper halves.

\* \* \* \* \*